United States Patent [19]

Shigehiro et al.

[11] 4,155,872

[45] May 22, 1979

[54] NEMATIC LIQUID CRYSTAL COMPOSITIONS

[75] Inventors: Minezaki Shigehiro, Nara; Funada Fumiaki, Yamatokooriyama; Matsuura Masataka, Tenri, all of Japan

[73] Assignee: Sharp Corporation, Osaka, Japan

[21] Appl. No.: 860,488

[22] Filed: Dec. 14, 1977

[30] Foreign Application Priority Data

Dec. 28, 1976 [JP] Japan .................................. 51-160595

[51] Int. Cl.² .......................... C09K 3/34; G02F 1/13
[52] U.S. Cl. ................................ 252/299; 252/408; 350/350
[58] Field of Search ................. 252/299, 408; 350/350

[56] References Cited

U.S. PATENT DOCUMENTS

| | | | |
|---|---|---|---|
| 3,656,834 | 4/1972 | Haller et al. | 252/408 |
| 3,956,168 | 5/1976 | Arai et al. | 252/299 |
| 3,963,638 | 6/1976 | Bucher et al. | 252/299 |

FOREIGN PATENT DOCUMENTS

| | | | |
|---|---|---|---|
| 2629698 | 1/1977 | Fed. Rep. of Germany | 252/299 |
| 7702992 | 4/1977 | Netherlands | 252/299 |
| 1436756 | 5/1976 | United Kingdom | 252/299 |

*Primary Examiner*—Benjamin R. Padgett
*Assistant Examiner*—T. S. Gron
*Attorney, Agent, or Firm*—Hubbell, Cohen, Stiefel & Gross

[57] ABSTRACT

Nematic liquid crystal compositions containing at least one primary, secondary or tertiary aliphatic amine salt of aliphatic or aromatic monocarboxylic acids outstanding in the response speed and in the ability to produce a high degree of turbidity, low in the temperature dependence of conductivity (current) and having the long axes of the liquid crystal molecules uniformly oriented perpendicular to electrode base plates when filling the space between the base plates.

10 Claims, 1 Drawing Figure

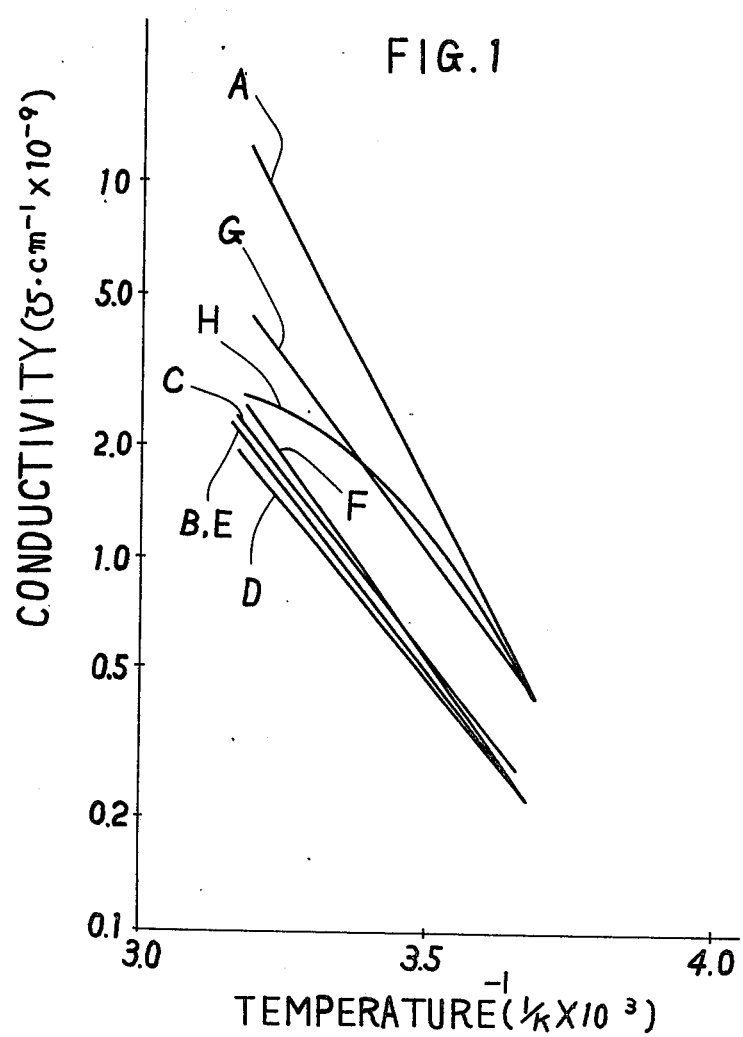

NEMATIC LIQUID CRYSTAL COMPOSITIONS

BACKGROUND OF THE INVENTION

This invention relates to liquid crystal compositions comprising a nematic liquid crystal material and a specific salt and to the use thereof.

When the space between electrodes on the opposed surfaces of two base plates is filled with a nematic liquid crystal composition to form a thin transparent layer and voltage is impressed across the nematic liquid crystal layer between the electrodes with light incident on the layer, the liquid crystal layer becomes turbid where the voltage is applied, consequently blocking the light. This phenomenon is already known.

The phenomenon is utilized in light blocking systems as well as in devices for displaying characters, numerial figures, symbols, patterns, etc. It has been attempted to incorporate various additives into nematic liquid crystal materials for use in such devices to enhance the turbidity or response speed of the liquid crystal layer.

Examples of additives usually used for this purpose are quaternary ammonium halides (U.S. Pat. No. 3,656,834, No. 3,882,039), carboxylic acid salts thereof (U.S. Pat. No. 3,956,168), pyridinium halides (Japanese Patent Early Publication No. 37,883/1974) and sulfonic acid salts thereof (U.S. Pat. No. 3,963,638). However, nematic liquid crystal compositions containing these additives have the drawback that the conductivity (current) is dependent heavily on the temperature (i.e. great variations of conductivity relative to variations in temperature). In fact, when such known liquid crystal compositions are rendered equivalent to liquid crystal compositions incorporating an additive of this invention in respect of the conductivity (current) required for producing a turbidity in a low temperature range (e.g. at 0° C.) with application of a.c. voltage, the former entails higher power consumption than the latter in a high temperature range (e.g. at 25° C.).

For the development of turbidity, liquid crystal systems must have a conductivity higher than a definite level which is determined by the value of dielectric constant multiplied by drive frequency.

The temperature dependence of the conductivity is expressed generally by:

$$\sigma = \sigma_0 \exp(-\Delta E/kT)$$

where
- $\sigma$: conductivity at temperature T°K
- $\sigma_0$: conductivity at temperature $\infty$°K
- $\Delta E$: activation energy
- k: Boltzmann's constant
- T: absolute temperature According to the above equation, the lowest conductivity required for producing an effective turbidity in the liquid crystal system at 0° C. with the application of given voltage (25 V, 60 Hz) is about $10^{-10}\Omega.cm^{-1}$. On the other hand, the conductivity $\sigma$ at any temperature above 0° C. is such that the lower the activation energy for the conductivity, the lower will be the temperature dependence, hence savings in power consumption.

To improve the contrast ratio between the light scattering portion and the non-scattering portion, it is critical that at levels lower than the threshold voltage for producing an effective turbidity, the orientation of the liquid crystal molecules is so regulated that the long axes of the molecules are regularly positioned perpendicular to the electrode base plates. To ensure uniform perpendicular orientation, it has been common practice to apply an orienting agent to the opposed surfaces of the base plates, to add such an agent to the liquid crystal material or to treat the surfaces with an acid, but not infrequently the orienting agent applied to the base plates will dissolve out into liquid crystals, consequently varying the conductivity of the liquid crystals and degrading the crystals.

In view of the problems described above, this invention has been accomplished.

SUMMERY OF THE INVENTION

The object of this invention is to provide liquid crystal compositions which are outstanding in the response speed and in the ability to produce a high degree of turbidity and low in the temperature dependence of conductivity and which are further characterized in that the long axes of the liquid crystal molecules can be uniformly oriented perpendicular to electrode base plates.

The nematic liquid crystal composition of the present invention comprises a nematic liquid crystal material and at least one salt of an aliphatic amine having the formula (I):

wherein A is an unsubstituted alkyl group having 7-25 carbon atoms, and $R_1$ and $R_2$ may be the same or different and are each a hydrogen atom, lower alkyl group of 1-4 carbon atoms or benzyl group,
with an aliphatic or aromatic monocarboxylic acid having the formula (II):

wherein X is a group of the formula $C_mH_{2m+1}$ in which m is an integer of 1~6 or a group of the formula

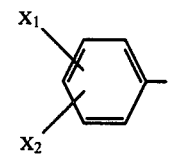

in which $X_1$ and $X_2$ may be the same or different and are each a hydrogen, bromine or chlorine atom or a nitro, methyl or methoxy group.

The salt is added to the nematic liquid crystal material in an amount of about 0.05~3.0% by weight, preferably about 0.1~2.5% by weight, based on said crystal material.

The liquid crystal composition prepared has the characteristics of producing a high degree of turbidity, having a high response speed and being low in the temperature dependence of its conductivity. We have also found that the liquid crystal composition incorporating the specific additive of this invention has the characteristics that the long axis of the liquid crystal molecules can be spontaneously oriented perpendicular to the base plate surface without using any of the orienting agents heretofore employed.

BRIEF DESCRIPTION OF THE DRAWING

FIG. 1 is a diagram showing the temperature dependence of conductivity of the liquid crystal compositions according to this invention in comparison with that of a conventional liquid crystal composition, in which Curve A represents the characteristics of the conventional composition and Curves B~H represent those of the present compositions prepared in Examples of this invention.

DESCRIPTION OF THE PREFERRED EMBODIMENTS

The additives of this invention, namely aliphatic amine salts of aliphatic or aromatic monocarboxylic acids, are represented by the formula (III):

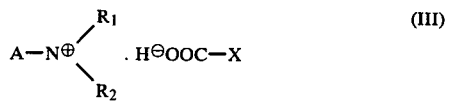

wherein A, $R_1$, $R_2$ and X have the same meaning as defined above.

The aliphatic amine component of the additives is a primary, secondary or tertiary alkyl amine whose alkyl group being straight chain of 7~25 carbon atoms, preferably 8~16 carbon atoms.

Examples of useful primary amines are n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine, n-nonadecylamine, n-eicosylamine, n-heneicosylamine, n-docosylamine, n-tricosylamine, n-tetracosylamine and n-pentacosylamine.

The substituents $R_1$ and $R_2$ attached to the nitrogen atom may be the same or different. Exemplary of lower alkyl groups for $R_1$ and $R_2$ are methyl, ethyl, n-propyl and n-butyl. Preferably $R_1$ and $R_2$ are each hydrogen, methyl or benzyl.

Examples of useful secondary amines are N-methyl-n-octylamine, N-ethyl-n-dodecylamine, N-benzyl-n-dodecylamine, etc. Examples of tertiary amines include N,N-dimethyl-n-octylamine, N,N-dimethyl-n-dodecylamine, N,N-dimethyl-n-pentacosylamine, N,N-dimethyl-n-hexadecylamine, N,N-diethyl-n-hexadecylamine, N-methyl-N-benzyl-n-octylamine, N-methyl-N-benzyl-n-dodecylamine, N-methyl-N-benzyl-n-hexadecylamine and so forth.

The other component of the additives of this invention is an aliphatic monocarboxylic acid represented by the formula $C_mH_{2m+1}COOH$ wherein m is an integer of 1~6, preferably 2. Examples of such aliphatic monocarboxylic acids are acetic acid, propionic acid and hexanoic acid.

Alternatively the second component is an aromatic monocarboxylic acid represented by the formula:

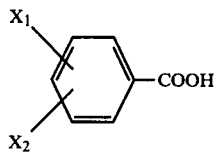

wherein $X_1$ and $X_2$ are each hydrogen, bromine, chlorine, nitro, methyl or methoxy. Examples of such acids are unsubstituted benzoic acid; mono-substituted benzoic acids such as p-methyl-benzoic acid, p-nitrobenzoic acid, p-bromobenzoic acid, o-methylbenzoic acid, m-chlorobenzoic acid and p-methoxybenzoic acid; and di-substituted benzoic acids such as 3,5-dinitrobenzoic acid, 2,4-dinitrobenzoic acid, 3,5-dimethylbenzoic acid, 3,4-dimethoxybenzoic acid, 3,5-dibromobenzoic acid and 3,5-dichlorobenzoic acid.

Liquid crystal compositions, when incorporating an aliphatic amine alone, will have difficulty in giving satisfactory conductivities, whereas the use of an aliphatic or aromatic monocarboxylic acid alone as an additive makes it impossible to uniformly orient the long axes of the liquid crystal molecules perpendicular to the base plates, while promoting the decomposition of Schiff basetype liquid crystals having an azomethine group or of ester type liquid crystals having an ester group.

However, the additives of this invention, namely aliphatic amine salts of aliphatic or aromatic monocarboxylic acids, give liquid crystal compositions a satisfactory effect to produce a high degree of turbidity, an increased response speed and reduced temperature dependence of conductivity without causing the decomposition of the liquid crystal material, thus ensuring the perpendicular orientation of the liquid crystal molecules with improved uniformity.

The additives of this invention function to orient the liquid crystal molecules with the long axis thereof positioned perpendicular to the base plate. Presumably this is attributable to the fact that the salt formed by the aliphatic amine forms a hydrophobic film on the surface of the glass base plate or on a silicon monoxide coating over the glass surface, providing a low-energy surface of reduced critical surface tension, with the result that the liquid crystal molecules in contact with this surface are oriented perpendicular to the interface, namely in the direction in which the crystals per se have reduced surface tension.

The additives are effective on any nematic liquid crystal materials of the Nn type (negative in dielectric anisotrophy), such as p-azoxyanisole and like azoxy compounds, p-pentylphenyl-2-chloro-4-(p-pentylbenzoyloxy)benzoate and like ester-type compounds, p-alkoxybenzylidene-p'-alkylaniline and like Schiff base-type compounds, and p-alkyl-p'-alkoxy-α-chlorostilbene and like stilbene-type compounds.

This invention is further illustrated by the following non-limiting examples.

The synthetic schemes for the preparation of the above mentioned additives are as follows. In the following schemes, A and X have the same meaning as defined in above.

Scheme 1

Salts of N,N-dimethyl-n-alkylamines with organic monocarboxylic acisds.

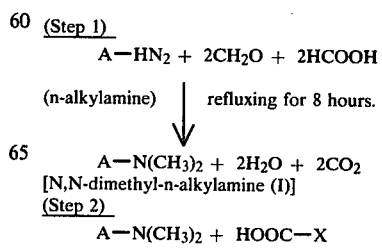

-continued

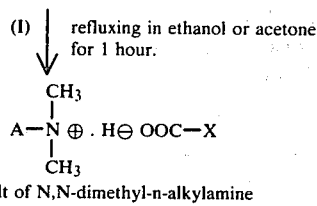

(A salt of N,N-dimethyl-n-alkylamine with organic monocarboxylic acid)

Scheme 2

A salt of N-methyl-N-benzyl-n-dodecylamine with 3,5-dinitrobenzoic acid or 2,4-dinitrobenzoic acid.

(Step 1)

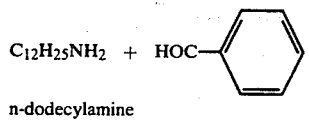

n-dodecylamine

| refluxing in ethanol, with a catalytic amount of acetic acid for 4 hours.

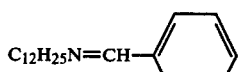

[N-benzylidene-n-dodecylamine (II)]

(Step 2)

| with lithium aluminum hydride, in anhydrous tetrahydrofuran, at room temperature for 1 hour and at 50° ~ 60° C. for 1 hour.

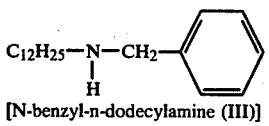

[N-benzyl-n-dodecylamine (III)]

(Step 3)

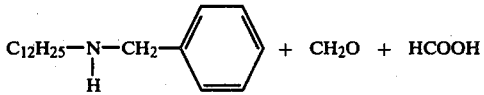 + $CH_2O$ + HCOOH

| (III) refluxing

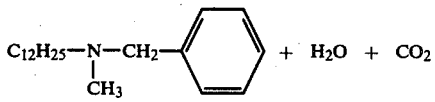 + $H_2O$ + $CO_2$

[N-methyl-N-benzyl-n-dodecylamine (IV)]

(Step 4)

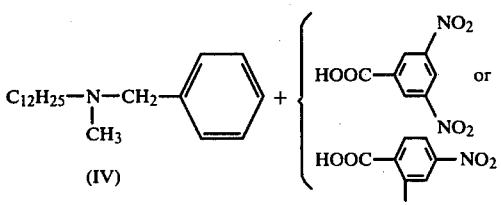

(3,5-dinitrobenzoic acid or 2,4-dinitrobenzoic acid) refluxing in ethanol or acetone, for 1 hour.

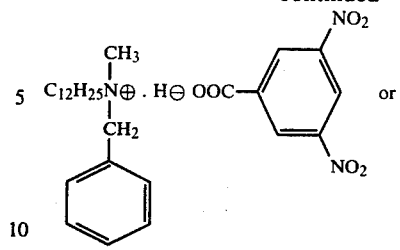 or

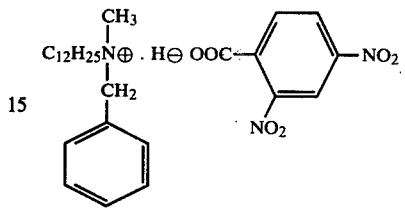

(A salt of N-methyl-N-benzyl-n-dodecylamine with 3,5-dinitrobenzoic acid or 2,4-dinitrobenzoic acid.)

Scheme 3

Salts of n-alkylamines with organic monocarboxylic acids

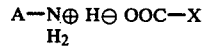 + HOOC—X

| refluxing in acetone, for 1 hour.

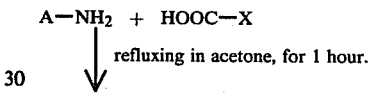

(Salts of n-alkylamines with organic monocarboxylic acids)

The synthetic processes for the modifiers of the invention are explained in accordance with the order of the above schemes.

EXAMPLE 1

(Step 1)

To 25.6 g (0.5 mol.) of commercial formic acid (85~90%) which was cooled by cold water was gradually added 0.1 mol. of n-alkylamine and then 22.5 ml (0.3 mol.) of formaldehyde (37%). The mixture was heated to 90°~100° C. After 2~3 mins., carbon dioxide gas generated, during which the mixture was cooled to room temperature. When the evolution of carbon dioxide stopped, the mixture was again refluxed at 90°~100° C. for 8 hours. After completing the reaction, 50 ml of 4 N-hydrochloric acid was added to the cooled mixture, which was condensed to dryness under reduced pressure. The residue (pale yellowish viscous liquid) was dissolved in 30~40 ml of water. After the addition of 25 ml of 18 N-sodium hydroxide solution, the mixture was separated into an oily layer and an aqueous layer, the latter of which was extracted with benzene. The benzene extract was distilled under reduced pressure to obtain N,N-dimethylalkylamine (I).

The boiling point and appearance of each N,N-dimethyl-n-alkylamine are shown in the following Table 1.

Table 1

| $C_nH_{2n+1}N(CH_3)_2$ | b.p. (°C.) | Appearance |
|---|---|---|
| n = 8 | 55 ~ 57 / 5 mmHg | colorless liquid |
| n = 12 | 93 ~ 95 / 1 mmHg | " |

Table 1-continued

| $C_nH_{2n+1}N(CH_3)_2$ | b.p. (°C.) | Appearance |
|---|---|---|
| n = 16 | 147 ~ 150 / 1 mmHg | " |

(Step 2)

Each equivalent molecular amount of the resulted N,N-dimethyl alkylamine and an organic monocarboxylic acid was reacted in ethanol or acetone at 40°~50° C. for one hour to yield a salt of N,N-dimethyl alkylamine with an organic monocarboxylic acid, which can be purified by reprecipitation using benzene-n-hexane.

The melting point and appearance of each of salts of N,N-dimethyl-n-alkylamine with organic monocarboxylic acids are shown in the following Table 2.

Table 2

| Organic monocarboxylates of N,N-dimethyl-n-alkylamines | * m.p. (°C.) | Appearance |
|---|---|---|
| 3,5-dinitrobenzoate of N,N-dimethyl-n-octylamine | 102 ~ 103 | yellowish solid |
| 2,4-dinitrobenzoate of N,N-dimethyl-n-octylamine | — | yellowish oil |
| 3,5-dinitrobenzoate of N,N-dimethyl-n-dodecylamine | 52 ~ 53 | yellowish solid |
| 2,4-dinitrobenzoate of N,N-dimethyl-n-dodecylamine | 48 ~ 49 | white solid |
| p-nitrobenzoate of N,N-dimethyl-n-dodecylamine | 78 ~ 79 | " |
| 3,4-dimethoxybenzoate of N,N-dimethyl-n-dodecylamine | 26 ~ 32 | light gray solid |
| benzoate of N,N-dimethyl-n-dodecylamine | 43 ~ 44 | white solid |
| p-bromobenzoate of N,N-dimethyl-n-dodecylamine | 40 ~ 41 | " |
| 3,5-dinitrobenzoate of N,N-dimethyl-n-hexadecylamine | 64 ~ 65 | pale yellowish solid |
| 2,4-dinitrobenzoate of N,N-dimethyl-n-hexadecylamine | 60 ~ 61.5 | white solid |

* Measured by micro-measuring apparatus for melting point (Yanagimoto Manufacturing Co., Ltd.)

EXAMPLE 2

(Step 1)

18.5 g (0.1 mol.) of n-dodecylamine, 10.6 g (0.1 mol.) of benzaldehyde and a catalytic amount of acetic acid were reacted in anhydrous ethanol at 60°~70° C. for 4 hours. After distilling ethanol off, the residue was further distilled under reduced pressure to obtain N-benzylidene-n-dodecylamine (II), (b.p. 160°~163° C./0.6 mmHg) as a transparent oil which includes low melting solids.

(Step 2)

1.9 g (0.05 mol.) of lithium aluminum hydride was dissolved in 80 ml of anhydrous tetrahydrofuran. N-benzylidene-n-dodecylamine was gradually added to the mixture at room temperature and heated at 50°~60° C. for an hour to yield N-benzyl-n-dodecylamine (III). The product was purified by distillation. b.p. 150°~157° C./0.6 mmHg.

(Step 3)

To 8.96 g (0.105 mol.) of commercial formic acid (85~90%) which was cooled by cold water was gradually added 9.5 g (0.035 mol.) of N-benzyl-n-dodecylamine. Then 2.4 ml (0.0525 mol.) of formaldehyde (37%) was added to the mixture and heated at 90°~100° C. After several minutes, carbon dioxide gas generated, during which the mixture was cooled to room temperature. When the evolution of carbon dioxide stopped, the mixture was again refluxed at 90°~100° C. for 8 hours. After completing the reaction, 18 ml of 4 N-hydrochloric acid was added to the cooled reaction mixture, which was condensed to dryness under reduced pressure. The residue was dissolved in 5 ml of water. 10 ml of 18N-sodium hydroxide solution was added to the aqueous solution which was separated into an oily layer and an aqueous layer, the latter of which was extracted with benzene. The benzene extract was distilled under reduced pressure to obtain N-methyl-N-benzyl-n-dodecylamine, b.p. 146 ~ 149° C./0.4 mmHg.

(Step 4)

Each equivalent molecular amount of the resulted N-methyl-N-benzyl-n-dodecylamine and 3,5-dinitrobenzoic acid or 2,4-dinitrobenzoic acid was reacted in ethanol or acetone at 40 ~ 50° C. for an hour to yield a salt of N-methyl-N-benzyl-n-dodecylamine with 3,5-dinitrobenzoic acid or 2,4-dinitrobenzoic acid.

The appearance of each salt are shown in the following Table 3.

Table 3

| Compound | Appearance |
|---|---|
| 3,5-dinitrobenzoate of N-methyl-N-benzyl-n-dodecylamine | yellowish paste |
| 2,4-dinitrobenzoate of N-methyl-N-benzylmn-dodecylamine | yellowish oil |

EXAMPLE 3

The reaction of each equivalent molecular amount of n-alkylamine and organic monocarboxylic acid in acetone at 25 ~ 40° C. for an hour yielded the desired salt. The salt can be purified by reprecipitation using benzene-n-hexane.

Table 4

| Salts of n-alkylamines with organic monocarboxylic acids | * m.p. (°C.) | Appearance |
|---|---|---|
| propionate of n-dodecylamine | 55 ~ 56 | white solid |
| hexanoate of n-dodecylamine | 28 ~ 31 | " |
| 3,5-dinitrobenzoate of n-dodecylamine | 130 ~ 131 | " |
| p-nitrobenzoate of n-dodecylamine | 126 ~ 127 | " |
| 3,5-dinitrobenzoate of n-hexadecylamine | 128 ~ 129 | " |

The following Examples show the electrical properties of the nematic liquid crystal compositions prepared according to this invention by the use of the additives described.

EXAMPLE 4

A nematic liquid crystal mixture was prepared from the liquid crystal materials shown in Table 5 below in the proportions indicated.

Table 5

| Liquid crystal material | Mixing proportion |
|---|---|
| p-methoxybenzylidene-p'-butylaniline | 36 wt % |
| p-ethoxybenzylidene-p'-butylaniline | 40 wt % |
| p-butoxybenzylidene-p'-butylaniline | 24 wt % |

The above mixture is in a liquid crystal state at the temperature between −16° C. and 63° C.

Two glass plates, each provided with a transparent electrode of indium oxide on one surface, are arranged in parallel to each other with the electrodes facing each other as spaced apart by 20 μm to prepare a liquid crystal cell of the transparent type.

The cell was filled with the liquid crystal mixture to form a thin transparent layer, and a.c. voltage, 25 V and 60 Hz, was impressed across the layer between the electrodes to measure the current flowing therebetween, the response speed, threshold voltage and light transmittance. Also tested in the same manner as above were a liquid crystal mixture, a liquid crystal composition prepared by adding an usual additive (tetrabutylammonium bromide) to the liquid crystal mixture and those prepared by adding to the liquid crystal mixture various additives of this invention in varying proportions. The results are given in Table 6.

results shown in Table 7 and FIG. 1. The liquid crystal compositions represented by Curves A ~ H in FIG. 1 were prepared by adding the following additives to the liquid crystal mixture listed in Table 5. Curve A: 0.05% by weight of tetrabutylammonium salt of 3,5-dinitrobenzoic acid; Curve B: 0.8% by weight of N,N-dimethyl-n-octylamine salt of 3,5-dinitrobenzoic acid (additive of this invention, the same as hereinafter); Curve C: 0.7% by weight of N,N-dimethyl-n-dodecylamine salt of 3,5-dinitrobenzoic acid; Curve D: 1.0% by weight of N,N-dimethyl-n-dodecylamine salt of 2,4-dinitrobenzoic acid; Curve E: 1.0% by weight of N,N-dimethyl-n-hexadecylamine salt of 3,5-dinitrobenzoic acid; Curve F: 1.5% by weight of N,N-dimethyl-n-hexadecylamine salt of 2,4-dinitrobenzoic acid; Curve G: 1.0% by weight of N-methyl-N-benzyl-n-dodecylamine salt of 3,5-dinitrobenzoic acid; and Curve H: 0.3% by Table 6

| Additive | Amount added (wt %) | Threshold Voltage (Vr.m.S.) | Current (μA/cm²) | Light Transmittance (%) | Response speed (m sec) Rising time | Response speed (m sec) Dropping time |
| --- | --- | --- | --- | --- | --- | --- |
| not used | 0 | — | 1.0 | 100.0 | — | — |
| tetrabutylammonium-bromide | 0.1 | 6.8 | 5.0 | 35.0 | 70 | 400 |
| 3,5-dinitrobenzoate of n-dodecylamine | 0.3* | 7.1* | 24.0* | 14.0* | 75* | 550* |
| 2,4-dinitrobenzoate of N,N-dimethyl-n-dodecylamine | 0.5 | 7.0 | 6.0 | 18.5 | 60 | 240 |
|  | 0.8 | 6.5 | 8.4 | 18.0 | 50 | 250 |
|  | 1.0 | 6.2 | 10.6 | 12.0 | 50 | 230 |
| 3,5-dinitrobenzoate of N,N-dimethyl-n-dedecylamine | 0.1 | 11.0 | 2.6 | 39.0 | 110 | 125 |
|  | 0.5 | 6.7 | 11.0 | 19.0 | 50 | 250 |
|  | 1.0 | 5.8 | 14.5 | 16.5 | 45 | 210 |
| 2,4-dinitrobenzate of N-methyl-N-benzyl-n-dodecylamine | 0.1 | 13.0 | 2.6 | 45.0 | 150 | 130 |
|  | 0.5 | 7.4 | 5.6 | 20.5 | 80 | 250 |
|  | 1.0 | 6.5 | 11.0 | 16.5 | 65 | 250 |
| 3,5-dinitrobenzoate of N-methyl-N-benzyl-n-dodecylamine | 0.1 | 11.7 | 2.6 | 42.5 | 140 | 150 |
|  | 0.5 | 6.5 | 12.5 | 18.5 | 60 | 230 |
|  | 1.0 | 6.2 | 26.0 | 17.0 | 50 | 300 |
| 3,5-dinitrobenzoate of N,N-dimethyl-n-octylamine | 0.5 | 6.5 | 7.0 | 19.5 | 70 | 250 |
|  | 0.8 | 6.2 | 12.3 | 18.5 | 50 | 270 |
|  | 1.0 | 6.0 | 15.7 | 15.0 | 50 | 210 |
| 3,5-dinitrobenzoate of N,N-dimethyl-n-hexadecylamine | 0.5 | 7.8 | 5.6 | 15.0 | 75 | 400 |
|  | 0.8 | 6.3 | 8.0 | 16.0 | 65 | 275 |
|  | 1.0 | 7.4* | 12.0* | 15.0* | 70* | 500* |
| 2,4-dinitrobenzoate of N,N-dimethyl-n-hexadecylamine | 0.5 | 6.8 | 5.1 | 19.5 | 70 | 270 |
|  | 1.0 | 6.3 | 12.0 | 19.0 | 50 | 220 |
|  | 1.5 | 6.3 | 13.4 | 15.0 | 65 | 370 |

Measuring condition: 25 V,60 Hz, 20 μm, 25° C., sine wave
*Value in homeotropic orientation Similarly liquid crystal compositions were tested for the temperature dependence of conductivity, with the weight of n-dodecylamine salt of 3,5-dinitrobenzoic acid.

Table 7

| Additive | Amount added (wt %) | Temperature (°C.) | Current (μA/cm²) | Conductivity (υcm⁻¹) | Current at 40° C. Current at 0° C. | Activation energy (eV) |
| --- | --- | --- | --- | --- | --- | --- |
| 3,5-dinitrobenzoate of tetrabutylammonium | 0.05 | 0 | 5.7 | 0.48 × 10⁻⁹ | 26.3 | 0.6 |
|  |  | 25 | 55 | 4.4 × 10⁻⁹ |  |  |
|  |  | 40 | 150 | 1.2 × 10⁻⁸ |  |  |
| 3,5-dinitrobenzoate of n-dodecylamine | 0.3 | 0 | 6.0 | 5.0 × 10⁻¹⁰ | 5.5 | 0.32 |
|  |  | 25 | 24.0 | 2.0 × 10⁻⁹ |  |  |
|  |  | 40 | 33.0 | 2.7 × 10⁻⁹ |  |  |
| 3,5-dinitrobenzoate of N,N-dimethyl-n-dodecylamine | 0.7 | 0 | 3.3 | 2.7 × 10⁻¹⁰ | 8.4 | 0.38 |
|  |  | 25 | 12.5 | 1.0 × 10⁻⁹ |  |  |
|  |  | 40 | 27.8 | 2.3 × 10⁻⁹ |  |  |
| 2,4-dinitrobenzoate of N,N-dimethyl-n-dodecylamine | 1.0 | 0 | 2.8 | 2.4 × 10⁻¹⁰ | 7.1 | 0.37 |
|  |  | 25 | 10.4 | 8.8 × 10⁻¹⁰ |  |  |
|  |  | 40 | 20.0 | 1.7 × 10⁻⁹ |  |  |
| 3,5-dinitrobenzoate of N-methyl-N-benzyl-n-dodecylamine | 1.0 | 0 | 5.5 | 4.6 × 10⁻¹⁰ | 9.1 | 0.38 |
|  |  | 25 | 26.0 | 2.2 × 10⁻⁹ |  |  |
|  |  | 40 | 50.0 | 4.2 × 10⁻⁹ |  |  |
| 2,4-dinitrobenzoate of N-methyl-N-benzyl-n-dodecylamine | 1.0 | 0 | 2.6 | 2.1 × 10⁻¹⁰ | 9.0 | 0.39 |
|  |  | 25 | 11.0 | 0.9 × 10⁻⁹ |  |  |
|  |  | 40 | 23.5 | 1.9 × 10⁻⁹ |  |  |

Table 7-continued

| Additive | Amount added (wt %) | Temperature (°C.) | Current (μA/cm²) | Conductivity (vcm⁻¹) | Current at 40° C. Current at 0° C. | Activation energy (eV) |
| --- | --- | --- | --- | --- | --- | --- |
| 3,5-dinitrobenzoate of N,N-dimethyl-n-octylamine | 0.8 | 0 | 2.9 | $2.3 \times 10^{-10}$ | 9.4 | 0.40 |
| | | 25 | 12.3 | $1.0 \times 10^{-9}$ | | |
| | | 40 | 26.2 | $2.1 \times 10^{-9}$ | | |
| 3,5-dinitrobenzoate of N,N-dimethyl-n-hexadecylamine | 1.0 | 0 | 2.8 | $2.3 \times 10^{-10}$ | 9.6 | 0.39 |
| | | 25 | 12.0 | $1.0 \times 10^{-9}$ | | |
| | | 40 | 27.0 | $2.2 \times 10^{-9}$ | | |
| 2,4-dinitrobenzoate of N,N-dimethyl-n-hexadecylamine | 1.5 | 0 | 2.9 | $2.4 \times 10^{-10}$ | 10.6 | 0.42 |
| | | 25 | 13.4 | $1.1 \times 10^{-9}$ | | |
| | | 40 | 30.6 | $2.5 \times 10^{-9}$ | | |

Measuring condition: 25 V, 60 Hz, 20 μm, sine wave

EXAMPLE 5

Two glass plates were prepared each of which was provided with a transparent electrode of indium oxide covered with a silicon oxide film formed by vacuum evaporation. (Vacuum evaporation conditions: base plate temperature of 350° C., vacuum of $7 \times 10^{-4}$ Torr (O₂ leak), rate of 1 ~ 1.5 A/sec, film thickness of 500 A). The glass plates were arranged in parallel to each other with the electrodes facing each other, and the space between the plates was filled with the same liquid crystal mixture as used above. The mixture was checked for the perpendicular orientation of the liquid crystals by the use of a nicol prism. Similarly tested were a liquid crystal composition prepared by adding a usual additive (tetrabutylammonium salt of 3,5-dinitrobenzoic acid) to the liquid crystal mixture and those prepared by adding to the liquid crystal mixture various additives of this invention in varying proportions. Table 8 shows the results.

Table 8

| Additive | Amount added (wt %) | | | |
| --- | --- | --- | --- | --- |
| | 0.1 | 0.5 | 1.0 | 2.0 |
| 3,5-dinitrobenzoate of tetrabutylammonium | // | // | // | // |
| 3,5-dinitrobenzoate of n-dedecylamine | // | ⊥ | ⊥ | ⊥ |
| propionate of n-dodecylamine | // | ⊥ | ⊥ | ⊥ |
| hexanoate of n-dodecylamine | // | ⊥ | ⊥ | ⊥ |
| 3,5-dinitrobenzoate of N,N-dimethyl-n-octylamine | // | // | ⊥ | ⊥ |
| 3,5-dinitrobenzoate of n-hexadecylamine | ⊥ | ⊥ | ⊥ | ⊥ |
| 3,5-dinitrobenzoate of N-methyl-N-benzyl-n-dodecylamine | // | ⊥ | ⊥ | ⊥ |
| 2,4-dinitrobenzoate of N-methyl-N-benzyl-n-dodecylamine | // | // | ⊥ | ⊥ |
| 3,5-dinitrobenzoate of N,N-dimethyl-n-dodecylamine | ⊥ | ⊥ | ⊥ | ⊥ |
| 2,4-dinitrobenzoate of N,N-dimethyl-n-dodecylamine | ⊥ | ⊥ | ⊥ | ⊥ |
| 3,4-dimethoxybenzoate of N,N-dimethyl-n-dodecylamine | // | ⊥ | ⊥ | ⊥ |
| p-bromobenzoate of N,N-dimethyl-n-dodecylamine | ⊥ | ⊥ | ⊥ | ⊥ |
| 3,5-dinitrobenzoate of N,N-dimethyl-n-hexadecylamine | ⊥ | ⊥ | ⊥ | ⊥ |
| 2,4-dinitrobenzoate of N,N-dimethyl-n-hexadecylamine | ⊥ | ⊥ | ⊥ | ⊥ |

Table 6 reveals that the liquid crystal compositions prepared by adding additives of this invention to the liquid crystal mixture shown in Table 5 exhibit greatly improved properties in respect of current value, transmittance, response speed and threshold voltage, as compared with those containing none of these additives or incorporating the conventional additive.

Table 7 and FIG. 1 further indicate that the additives of this invention, when used, result in lower temperature dependence of conductivity than tetrabutylammonium salt of 3,5-dinitrobenzoic acid heretofore used.

Stated more specifically with reference to the equation defining the temperature dependence of conductivity, i.e. $\sigma = \sigma_0 \exp(+\Delta E/kT)$, the value ΔE, which is 0.6 eV in the case of conventional composition, is reducible to 0.32 ~ 0.42 eV by the use of the additive of this invention.

Table 7 shows that the ratio of increase in current (the ratio of current at 40° C. to current at 0° C.) involved in the compositions of this invention is as low as about 1/4.8 to about 1/2.5 that of the conventional composition.

The low temperature dependence of the current value leads to the advantage that liquid crystal display devices can be operated with a small power consumption. For instance, if the current value at the lowest excitation temperature of 0° C. is set at 5.0 μA/cm² (25 V, 60 Hz; cell thickness, 20 μm), the current level in a high temperature range of about 0° C., for example at 40° C., is 131.5 μA/cm² (25 V, 60 Hz; cell thickness, 20 μm) for the conventional composition and 27.5 ~ 58.3 μA/cm² (25 V, 60 Hz; cell thickness, 20 μm) for the compositions of this invention.

Additionally Table 8 reveals that the additives of this invention, unlike tetrabutylammonium salt of 3,5-dinitrobenzoic acid which is a conventional additive, act to uniformly orient the long axes of the liquid crystal molecules perpendicular to the base plate surfaces.

Thus the present additives which assure perpendicular orientation are advantageous in that the liquid crystal molecules can be uniformly and regularly oriented without the necessity of applying an orienting agent to the base plate surfaces or incorporating an additional orienting agent into the liquid crystal composition.

In brief, this invention affords an increased response speed, reduced temperature dependence of current value and improved turbidity on application of voltage.

The present additives useful as ion imparting agents also serve effectively in ensuring the perpendicular orientation of the liquid crystal molecules.

What is claimed is:

1. A nematic liquid crystal composition which comprises a nematic liquid crystal material having negative dielectric anisotropy and at least one salt of an aliphatic amine of the formula (I):

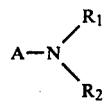

wherein A is an unsubstituted alkyl group having 7–25 carbon atoms, and $R_1$ and $R_2$ may be the same or different and are each a hydrogen atom, a lower alkyl group of 1–4 carbon atoms or a benzyl group, with an aliphatic or aromatic monocarboxylic acid of the formula (II):

X—COOH     (II)

wherein X is a group of the formula $C_mH_{2m+1}$ in which m is an integer of 1–6 or a group of the formula

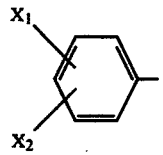

in which $X_1$ and $X_2$ may be the same or different and are each a hydrogen, bromine or chlorine atom or a nitro, methyl or methoxy group, said salt being present in an amount of about 0.05–3.0% by weight, based on the nematic liquid crystal material.

2. The nematic liquid crystal composition of claim 1 wherein the salt is present in an amount of about 0.1 ~ 2.5% by weight, based on the nematic liquid crystal material.

3. The nematic liquid crystal composition of claim 1 wherein the alkyl group of the symbol A is one having 8 ~ 16 carbon atoms.

4. The nematic liquid crystal composition of claim 1 wherein the aliphatic amine is n-octylamine, n-dodecylamine, n-hexadecylamine, N,N-dimethyl-n-octylamine, N,N-dimethyldodecylamine, N,N-dimethyl-n-hexadecylamine, N-methyl-N-benzyl-n-octylamine, N-methyl-N-benzyl-n-dodecylamine or N-methyl-N-benzyl-n-hexadecylamine.

5. The nematic liquid crystal composition of claim 1 wherein the aliphatic monocarboxylic acid is propionic acid or hexanoic acid.

6. The nematic liquid crystal composition of claim 1 wherein the aromatic monocarboxylic acid is benzoic acid, p-nitrobenzoic acid, p-bromobenzoic acid, 2,4-dinitrobenzoic acid, 3,5-dinitrobenzoic acid, 3,5-dimethylbenzoic acid or 3,4-dimethoxybenzoic acid.

7. The nematic liquid crystal composition of claim 1 wherein the salt is 2,4 (or 3,5)-dinitrobenzoate of N,N-dimethyl-n-dodecylamine.

8. The nematic liquid crystal composition of claim 1 wherein the salt is 2,4 (or 3,5)-dinitrobenzoate of N-methyl-N-benzyl-n-dodecylamine.

9. The nematic liquid crystal composition of claim 1 wherein the salt is 2,4 (or 3,5)-dinitrobenzoate of N,N-dimethyl-n-octylamine.

10. The nematic liquid crystal composition of claim 1 wherein the salt is 2,4 (or 3,5)-dinitrobenzoate of N,N-dimethyl-n-hexadecylamine.

UNITED STATES PATENT OFFICE
CERTIFICATE OF CORRECTION

Patent No. 4,155,872   Dated May 22, 1979

Inventor(s) Minezaki Shigehiro et al

It is certified that error appears in the above-identified patent and that said Letters Patent are hereby corrected as shown below:

Column 11 and 12, Table 7, continued, column 5, lines 5 and 6:

"$1.0 \times 10^-$"   should read -- $1.0 \times 10^{-9}$ --.
$2.2 \times 10^-$   $2.2 \times 10^{-9}$ Signed and Sealed this First Day of January 1980

[SEAL]

Attest:

SIDNEY A. DIAMOND

Attesting Officer   Commissioner of Patents and Trademarks